3,027,386
17-ACYLOXY-21-FLUOROPROGESTERONES
AND 6-METHYL DERIVATIVES
Clarence G. Bergstrom, Chicago, and Raymond M. Dodson, Park Ridge, Ill., assignors to G. D. Searle & Co., Chicago, Ill., a corporation of Delaware
No Drawing. Filed July 28, 1958, Ser. No. 751,191
8 Claims. (Cl. 260—397.47)

The present invention relates to new and highly potent hormonal agents and more particularly to 17-acyloxy-21-fluoroprogesterone and 6-methyl-17-acyloxy-21-fluoroprogesterone. These compounds can be represented by the general structural formula

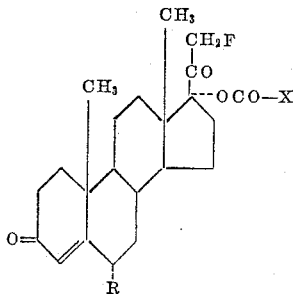

wherein R can be either hydrogen or a methyl group and wherein X is a saturated aliphatic hydrocarbon radical containing less than 8 carbon atoms. The radical X can represent such lower alkyl groups as methyl, ethyl, straight-chained and branched propyl, butyl, amyl, and hexyl. It can also represent such cyclo-aliphatic radicals as cyclopentyl, cyclohexyl, cyclopentylmethyl, cyclopentylethyl, cyclohexylmethyl, and the like.

The compounds of this invention have valuable hormonal properties and more particularly possess progestational activity. The progestational activity of these 21-fluoro compounds far surpasses that of the corresponding 21-chloro compounds or of the analogs not fluorinated in the 21-position, especially on oral administration.

The compounds of this invention are conveniently prepared from the corresponding 21-iodo compounds by halogen interchange. This interchange is conveniently achieved by refluxing with silver fluoride in acetonitrile.

The invention will appear more fully from the examples below. These examples are illustrative only and are not to be construed as limiting the invention in spirit or in scope. In these examples temperatures are given in degrees centigrade (° C.) and quantities of materials in parts by weight.

The present application is a continuation-in-part of our copending application Serial No. 597,858, filed July 16, 1956, now abandoned.

*Example 1*

A solution of 1 part of 17-hydroxy-21-iodoprogesterone in 100 parts of anhydrous acetonitrile is treated with 1 part of silver fluoride and the resulting solution is refluxed for 20 hours. The reaction mixture is filtered and the filtrate is diluted with 900 parts of ethyl acetate. The resulting solution is washed repeatedly with distilled water and dried over anhydrous sodium sulfate. The drying agent is removed by filtration and the filtrate is taken to dryness at reduced pressure. The resulting gum is purified by chromatography over silica gel. The column is developed with benzene solutions containing increasing concentrations of ethyl acetate. Elution with 15% ethyl acetate and concentration of the eluate yields 17-hydroxy-21-fluoroprogesterone which, recrystallized from methanol, melts at about 217–223° C. This compound has a specific rotation of about 137.8° in chloroform solution. The ultraviolet spectrum shows a maximum at about 241 millimicrons with a molecular extinction coefficient of about 16,900. The infrared spectrum shows maxima at 2.94, 5.78, 6.02, and 6.21 microns.

A solution of 200 parts of 17-hydroxy-21-fluoroprogesterone and 198 parts of p-toluenesulfonic acid monohydrate in 10,000 parts of glacial acetic acid and 2,000 parts of acetic anhydride is kept at 25° C. for 22 hours. The reaction mixture is then poured into 50,000 parts of ice water whereupon a gummy precipitate separates. The mixture is extracted with ethyl acetate and the resulting extract is washed successively with water, saturated aqueous sodium bicarbonate solution and again with water. It is then dried over anhydrous sodium sulfate and filtered. The filtrate is evaporated under nitrogen and the residue is repeatedly crystallized from methanol to yield 17-acetoxy-21-fluoroprogesterone melting at about 224–227° C. The compound shows an ultraviolet maximum at about 240 millimicrons with a molecular extinction coefficient of about 17,100.

*Example 2*

The suspension of 0.5 part of 17-hydroxy-21-fluoroprogesterone in a mixture of 24 parts of caproic acid and 2.4 parts of caproic anhydride and 0.2 parts of p-toluenesulfonic acid is stirred at room temperature for 7 days. The clear solution is poured into 500 parts of water and stirred for 2 hours. The now dark solution is extracted with benzene. The extract is washed successively with 5% sodium carbonate solution, water, and sodium chloride solution, and vacuum distilled to dryness. The residue is dissolved in 20 parts of methanol, treated with 0.25 parts of concentrated hydrochloric acid and stored at room temperature for 90 minutes. The solution is diluted with water and extracted with benzene. The resulting benzene extract is applied to a chromatography column containing silica gel. Elution with a 5% solution of ethyl acetate in benzene yields 17-hexanoyl-21-fluoroprogesterone, which, after recrystallization from a mixture of acetone and petroleum ether melts at about 117–118.5° C. The compound shows an ultraviolet absorption maximum at about 240 millimicrons and a molecular extinction coefficient of about 16,550.

*Example 3*

Use of equivalent amounts of β-cyclopentanepropionic acid and β-cyclopentanepropionic acid anhydride in place of the caproic acid and caproic anhydride used in the preceding example yields the 17-(β-cyclopentylpropionoxy)-21-fluoroprogesterone. The infrared absorption spectrum shows maxima at 5.79, 6.04, 6.20 and 7.90 microns.

*Example 4*

A solution of 5.2 parts of 3,20-bisethylenedioxy-17α,21-dihydroxy-5-pregnene in 41 parts of pyridine and 17.3 parts of acetic anhydride is stored at room temperature for about 24 hours and then is poured into ice water. The precipitate which forms is removed by filtration and is recrystallized from a mixture of pyridine, acetone and water to yield 3,20-bisethylenedioxy-17α-hydroxy-21-acetoxy-5-pregnene melting at about 217–219° C.

A solution of 29.7 parts of 3,20-bisethylenedioxy-17α- hydroxy-21-acetoxy-5-pregnene in 633 parts of chloroform and 85 parts of methylethyldioxolane is added, with stirring, to an ice cold mixture of 18 parts of 40% peroxyacetic acid, 21.3 parts of methylethyldioxolane, 79 parts of chloroform and 3.5 parts of sodium acetate. The mixture is maintained at about −2° C. for 17 hours, and is then shaken with a 10% solution of potassium carbonate, dried successively over sodium sulfate and potassium carbonate and concentrated almost to dryness. The crystals are filtered and recrystallized from methylethyldioxolane to yield 3,20-bisethylenedioxy-5β,6β-epoxy-17α-hydroxy-21-acetoxypregnane. Upon further recrystallization from a mixture of pyridine and acetone, the compound shows a melting point of 210–211.5° C., and has a specific rotation of −4.5° in chloroform.

Addition of 40 parts of methanol to the filtrate obtained in the preceding paragraph of this example causes the precipitation of 3,20-bisethylenedioxy-5α,6α-epoxy-17α-hydroxy-21-acetoxypregnane, in an almost pure state. This compound can be recrystallized from a mixture of acetone and petroleum ether or a mixture of pyridine and methanol. The compound melts at about 193.5–194.5° C., and has a specific rotation of −50° in chloroform.

Five parts of 3,20-bisethylenedioxy-5α,6α-epoxy-17α-hydroxy-21-acetoxypregnane in 90 parts of tetrahydrofuran is refluxed for 50 hours with 90 parts of a 3 molar solution of methylmagnesium bromide in ether. The excess reagent is destroyed by the addition of 1350 parts of moist ether. The organic layer is extracted with ammonium chloride solution, dried over sodium sulfate and distilled to dryness. The crystalline product is washed with ether and is used directly in the next step of the reaction sequence without recrystallization. The crude 3,20-bisethylenedioxy-6β-methyl-5α,17α,21-trihydroxypregnane shows a melting point of 210–215° C. and has absorption maxima in the infrared region at 2.86, 7.27, 8.31, 8.44, 9.17, 9.60, 9.85, 10.38, 11.00, 11.48, and 11.85 microns.

The crude triol obtained in the preceding paragraph of this example is hydrolyzed by refluxing a solution of 2.85 parts of it in 176 parts of methanol and 22 parts of an 8.5% solution of aqueous sulfuric acid for 10 minutes. The solvents used are previously boiled to eliminate oxygen and the hydrolysis is conducted under a nitrogen atmosphere. The solution is poured into a saturated sodium bicarbonate solution, which is then extracted with chloroform. The chloroform extract is washed with water to neutrality, dried over sodium sulfate and distilled to dryness. The crude 6β-methyl-5α,17α,21-trihydroxypregnane-3,20-dione thus obtained melts at about 215–225° C. and shows absorption in the infrared at 2.86, 3.40, 5.84, 7.19, 7.40, 8.12, 8.23, 9.18, 9.45, and 9.73 microns. The hydrolysis can also be conducted using aqueous acetic acid in place of aqueous sulfuric acid.

A solution of 2.39 parts of 6-methyl-5α,17α,21-trihydroxypregnane-3,20-dione in 22 parts of freshly distilled benzenesulfonyl chloride and 1.5 parts of collidine is stored at room temperature for 16 hours. Then the semisolid product is washed successively with petroleum ether, an acetone-petroleum ether solution and water. Upon crystallization from acetone there is obtained 6β-methyl-21-chloro-5α,17α-dihydroxypregnane-3,20-dione melting at about 243–247° C. with decomposition. The compound shows absorption in the infrared region at 2.92, 3.40, 3.49, 5.78, 5.90, 7.00, 7.15, 7.72, 8.10, 8.69, 9.14, 13.93, and 14.69 microns.

A solution of 1.15 parts of 6β-methyl-21-chloro-5α,17α-dihydroxypregnane-3,20-dione is refluxed for an hour with 20 parts of sodium iodide in 316 parts of acetone. The solution is concentrated, diluted with water, and extracted with ethyl acetate. The organic layer is separated, washed with 5% sodium thiosulfate solution, dried over sodium sulfate and distilled to dryness. The compound obtained, crude 6β-methyl-21-iodo-5α,17α-dihydroxypregnane-3,20-dione, does not show a melting point but decomposes to a black solid at about 160–165° C. It shows absorption in the infrared at 2.90, 5.82, 5.89, 7.16, 7.24, 8.11, 9.15, 9.47, 9.72, 10.27, and 10.88 microns.

A solution of 1.8 parts of 6β-methyl-21-iodo-5α,17α-dihydroxypregnane-3,20-dione in 430 parts of anhydrous acetonitrile is refluxed for 17 hours in a nitrogen swept Soxhlet apparatus the thimble of which contains 12 parts of anhydrous silver fluoride. The solution is cooled, filtered through a filter aid, and concentrated. It is then distributed between water and ethyl acetate. The organic layer is concentrated to dryness to yield crude 6β-methyl-21-fluoro-5α,17α-dihydroxypregnane-3,20-dione, which melts in the range of 175–195° C. The compound shows absorption in the infrared at 2.84, 2.92, 3.39, 5.82, 7.18, 8.11, and 9.11 microns. 1.5 parts of this crude fluoro compound is dissolved in 104 parts of acetic acid, 10 parts of acetic anhydride and 0.8 parts of p-toluenesulfonic acid monohydrate and maintained at room temperature for 19 hours under a nitrogen atmosphere. The solvents are previously boiled to remove oxygen. The solution is then poured into ice water containing sodium bicarbonate. The precipitate is recovered by filtration. It is crude 6-methyl-21-fluoro-3,17α-diacetoxy-3,5-pregnadien-20-one, having absorption in the infrared region at 3.40, 5.72, 6.87, 7.30, 8.22, 8.89, 9.23, 9.52, and 9.83 microns. The crude enol acetate (1.33 parts) is hydrolyzed by dissolving in 60 parts of oxygen-free methanol containing 0.75 parts of concentrated hydrochloric acid, and maintaining the solution at room temperature for 2 hours under a nitrogen atmosphere. The solution is poured into water, and the precipitate is recovered by filtration. The precipitate is taken up in benzene and applied to a chromatography column containing 160 parts of silica gel. Upon elution with a 10% solution of ethyl acetate in benzene and recrystallization from a mixture of acetone and petroleum ether, there is obtained 6α-methyl-17α-acetoxy-21-fluoroprogesterone melting at about 197.5–200° C. The compound shows absorption in the infrared region at 3.38, 5.73, 5.96, 6.22, 6.82, 7.27, 7.88, 8.05, 9.21, 9.51, 9.72, 9.83, and 11.53 microns. An ultraviolet maximum is observed at 40 millimicrons with an extinction coefficient of about 15,370.

*Example 5*

Substitution of equivalent amounts of caproic acid and caproic anhydride for the acetic acid and acetic anhydride used in the preceding example yields 6α-methyl-17α-hexanoyloxy-21-fluoroprogesterone. The infrared absorption spectrum shows maxima at 3.40, 5.73, 5.96, 6.22, and 8.50 microns.

*Example 6*

Nitrogen is bubbled through a solution of 0.26 parts of 6-methyl-5α,17α,21-trihydroxypregnane-3,20-dione in 24 parts of methanol for 30 minutes, after which 11 parts of 0.1 N sodium hydroxide solution are added. The solution is stored at room temperature for 5 hours, neutralized with 11 parts of 0.1 N hydrochloric acid solution and concentrated, using an aspirator and a water bath. During the concentration, the temperature is maintained between 30–35° C. To this solution are added 7 parts of solid sodium chloride and 100 parts of water. This mixture is refrigerated for 15 hours. The precipitate is collected on a filter and recrystallized from benzene to yield 6α-methyl-17α,21-dihydroxy-4-pregnene-3,20-dione melting at about 220–224° C. with decomposition.

A solution of 0.14 parts of 6α-methyl-17α,21-dihydroxy-4-pregnene-3,20-dione in 0.27 parts of collidine and 2.88 parts of benzenesulfonyl chloride is stored for 15 hours at room temperature. The solution is then diluted with 88 parts of benzene and applied to a chromatography column containing 22 parts of silica gel. The column is developed with benzene and benzene solutions containing increasing amounts of ethyl acetate. The fractions eluted with a 10% solution of ethyl acetate in benzene, a 15% solution of ethyl acetate in benzene and a 20% solution of ethyl acetate in benzene are combined and distilled to dryness. The residue is recrystallized successively from a solution of acetone and petroleum ether and a solution of acetone and water to yield 6α-methyl-17α-hydroxy-21-chloro-4-pregnene-3,20-dione melting at about 227–229° C. Infrared maxima are observed at 2.97, 5.78, 6.05, 6.23, 7.22, and 8.11 microns.

In a nitrogen-swept flask, a solution of 2.1 parts of 6α-methyl-17α-hydroxy-21-chloro-4-pregnene-3,20-dione, 32 parts of sodium iodide and 514 parts of acetone is refluxed for one hour. The solution is then concentrated to about one-tenth of its original volume under reduced pressure. Five hundred parts of water are added, and the solution is extracted several times with ethyl acetate. The organic layer is separated, washed successively with 150 parts of 5% sodium thiosulfate solution and 150 parts of water, dried over sodium sulfate, and concentrated to dryness under reduced pressure, using a room temperature water bath. The crude 6α-methyl-17α-hydroxy-21-iodo-4-pregnene-3,20-dione thus obtained is not purified, but is used directly in the next step of the reaction sequence.

A solution of 2.5 parts of 6α-methyl-17α-hydroxy-21-iodo-4-pregnene-3,20-dione in 390 parts of freshly distilled anhydrous acetonitrile is placed in the flask of a Soxhlet apparatus that contains 25 parts of anhydrous silver fluoride in the thimble. The system is flushed with nitrogen and the solution is then refluxed vigorously for 18 hours. The dark colored solution is cooled and filtered through a filter aid. The filtrate is concentrated under reduced pressure to about 50 parts, diluted with 500 parts of water, and extracted with ethyl acetate. The organic layer is separated, washed with water, dried over sodium sulfate, and distilled to dryness under vacuum. The residue is recrystallized successively from acetone, a solution of acetone and water, and a solution of acetone and petroleum ether to yield 6α-methyl-17α-hydroxy-21-fluoro-4-pregnene-3,20-dione. The compound shows absorption in the ultraviolet region at 242 millimicrons with an extinction coefficient of 16,600. Infrared maxima are observed at 2.92, 5.79, 6.01, and 6.21 microns.

To a solution of 2 parts of 6α-methyl-17α-hydroxy-21-fluoro-4-pregnene-3,20-dione in 130 parts of oxygen-free acetic acid and 13.5 parts of oxygen-free acetic anhydride is added 1 part of p-toluene-sulfonic acid. The solution is stored for 18 hours at room temperature under a nitrogen atmosphere and then poured into 2000 parts of cold water which contains 35 parts of sodium bicarbonate. The precipitate is recovered by filtration. It contains crude 3,17α-diacetoxy-6-methyl-21-fluoro-3,5-pregnadien-20-one. This is converted to 6α-methyl-17α-acetoxy-21-fluoroprogesterone as described in Example 4.

What is claimed is:
1. A compound of the structural formula

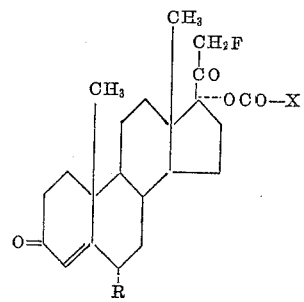

wherein R is a member of the class consisting of hydrogen and methyl and wherein X is a saturated aliphatic hydrocarbon radical containing less than 8 carbon atoms.
2. 17α-acetoxy-21-fluoroprogesterone.
3. 17α-hexanoyloxy-21-fluoroprogesterone.
4. 17α-cyclopentylpropionoxy-21-fluoroprogesterone.
5. A compound of the structural formula

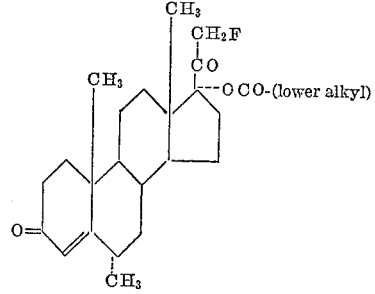

6. 6α-methyl-17α-acetoxy-21-fluoroprogesterone.
7. 6α-methyl-17α-hexanoyloxy-21-fluoroprogesterone.
8. A compound represented by the structural formula:

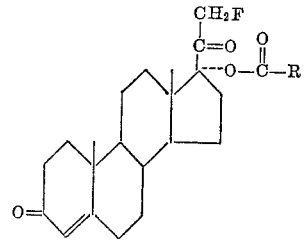

wherein R represents a saturated aliphatic hydrocarbon radical containing less than eight carbon atoms.

References Cited in the file of this patent
UNITED STATES PATENTS 2,668,816    Miescher et al.    Feb. 9, 1954
2,763,671    Fried et al.    Sept. 18, 1956

UNITED STATES PATENT OFFICE
CERTIFICATE OF CORRECTION

Patent No. 3,027,386 March 27, 1962

Clarence G. Bergstrom et al.

It is hereby certified that error appears in the above numbered patent requiring correction and that the said Letters Patent should read as corrected below.

Column 4, line 44, for "40" read -- 240 --.

Signed and sealed this 13th day of November 1962.

(SEAL)
Attest:

ERNEST W. SWIDER
Attesting Officer

DAVID L. LADD
Commissioner of Patents